(12) United States Patent
Tsunoda

(10) Patent No.: US 7,659,027 B2
(45) Date of Patent: Feb. 9, 2010

(54) FUEL CELL AND FUEL CELL STACK

(75) Inventor: Tadashi Tsunoda, Nerima-ku (JP)

(73) Assignee: Honda Motor Co., Ltd., Tokyo (JP)

( * ) Notice: Subject to any disclaimer, the term of this patent is extended or adjusted under 35 U.S.C. 154(b) by 826 days.

(21) Appl. No.: 11/016,677

(22) Filed: Dec. 17, 2004

(65) Prior Publication Data

US 2005/0136307 A1 Jun. 23, 2005

(30) Foreign Application Priority Data

Dec. 17, 2003 (JP) .............................. 2003-419952

(51) Int. Cl.
*H01M 2/08* (2006.01)
(52) U.S. Cl. .......................................... 429/37; 429/34
(58) Field of Classification Search .................. None
See application file for complete search history.

(56) References Cited

U.S. PATENT DOCUMENTS

| | | | |
|---|---|---|---|
| 3,607,425 A * | 9/1971 | Titterington et al. ............ | 429/9 |
| 4,510,212 A * | 4/1985 | Fraioli .......................... | 429/30 |
| 5,330,858 A | 7/1994 | Shundou et al. | |
| 6,645,659 B2 * | 11/2003 | Bisaka et al. .................. | 429/37 |
| 2002/0006535 A1 | 1/2002 | Woods et al. | |

FOREIGN PATENT DOCUMENTS

| | | |
|---|---|---|
| JP | 1-281681 | 11/1989 |
| JP | 02-234362 | 9/1990 |
| JP | 07-022059 | 1/1995 |
| JP | 2000-340249 | 12/2000 |
| JP | 3251919 | 11/2001 |
| JP | 2002-505510 | 2/2002 |
| WO | WO-99/44252 A1 | 9/1999 |

OTHER PUBLICATIONS

International Search Report for Application No. PCT/JP2004/019273, dated Mar. 6, 2006.
Japanese Office Action for Application No. 2003-419952, dated Feb. 26, 2008.

* cited by examiner

*Primary Examiner*—Patrick Ryan
*Assistant Examiner*—Cynthia Lee
(74) *Attorney, Agent, or Firm*—Lahive & Cockfield, LLP; Anthony A. Laurentano

(57) ABSTRACT

A fuel cell system includes a fuel cell stack, a fluid unit including a heat exchanger for heating an oxygen-containing gas, before the oxygen-containing gas is supplied to the fuel cell stack, and a casing for containing the fuel cell stack and the fluid unit. A first output terminal is electrically connected to one electrode, and provided adjacent to an end plate. A second output terminal is electrically connected to another electrode through a tightening member, and provided adjacent to the end plate. The fluid unit is provided adjacent to an end plate.

4 Claims, 9 Drawing Sheets

FUEL CELL AND FUEL CELL STACK

BACKGROUND OF THE INVENTION

1. Field of the Invention

The present invention relates to a fuel cell system including a fuel cell formed by sandwiching an electrolyte electrode assembly between a pair of separators. The electrolyte electrode assembly includes an anode, a cathode, and an electrolyte interposed between the anode and the cathode.

2. Description of the Related Art

Typically, a solid oxide fuel cell (SOFC) employs an electrolyte of ion-conductive solid oxide such as stabilized zirconia. The electrolyte is interposed between an anode and a cathode to form an electrolyte electrode assembly (unit cell). The electrolyte electrode assembly is interposed between separators (bipolar plates). In use, a predetermined numbers of the unit cells and the separators are stacked together to form a fuel cell stack.

In the fuel cell, an oxygen-containing gas or air is supplied to the cathode. The oxygen in the oxygen-containing gas is ionized at the interface between the cathode and the electrolyte, and the oxygen ions ($O^{2-}$) move toward the anode through the electrolyte. A fuel gas such as a hydrogen-containing gas or CO is supplied to the anode. Oxygen ions react with the hydrogen in the hydrogen-containing gas to produce water or react with CO to produce $CO_2$. Electrons released in the reaction flow through an external circuit to the cathode, creating a DC electric energy.

As an example of the fuel cell stack formed by stacking a plurality of fuel cells, a fuel cell stack disclosed in Japanese Patent No. 3,251,919 is known. According to the disclosure of Japanese Patent No. 3,251,919, as shown in FIG. 9, a fuel cell stack 2 is disposed in a pressure casing 1, and the fuel cell stack 2 is surrounded by thermal insulation material 3. Upper and lower tightening plates 4a, 4b of the fuel cell stack 2 are tightened by cylindrical tightening bolts 5.

Current terminals 6a, 6b are provided at upper and lower positions of the fuel cell stack 2. The current terminal 6a is connected to a current cable 7. The current cable 7 is inserted into one of the cylindrical tightening bolts 5, and connected to a current outlet 8a. The current terminal 6b is connected to a current outlet 8b adjacent to the current outlet 8a. A purge gas inlet pipe 9 is connected to the tightening bolts 5. A purge gas for cooling the current cable 7 is supplied through the purge gas inlet pipe 9.

Typically, fluid units such as a heat exchanger for heating an oxygen-containing gas and a reformer for reforming a fuel gas are provided for the fuel cell stack 2. However, in the structure of Japanese Patent No. 3,251,919, the fluid units cannot be suitably disposed in the pressure casing 1.

Further, the current cable 7 is inserted into the cylindrical tightening bolt 5, and the purge gas inlet pipe 9 for supplying the purge gas which cools the current cable 7 is connected to the tightening bolts 5. Therefore, the structure of the fuel cell stack 2 is complicated, and the production cost of the fuel cell 2 is high. Further, the layout of the fluid units is difficult.

SUMMARY OF THE INVENTION

A general object of the present invention is to provide a fuel cell system having a simple and compact structure which makes it possible to collect electrical energy from a fuel cell efficiently, and allows for more freedom in the layout.

According to the present invention, a fuel cell system comprises a fuel cell stack, a fluid unit, and a casing. The fuel cell stack includes a plurality of fuel cells stacked in a stacking direction, a pair of end plates provided at opposite ends of the fuel cells in the stacking direction, and a tightening member for tightening the end plates. Each of the fuel cells includes an electrolyte electrode assembly and separators sandwiching the electrolyte electrode assembly. The electrolyte electrode assembly includes a pair of electrodes and an electrolyte interposed between the electrodes. The fluid unit includes a heat exchanger for heating an oxygen-containing gas before it is supplied to the fuel cell stack. The casing contains the fuel cell stack and the fluid unit.

The fuel cell stack further comprises a first output terminal electrically connected to one of the electrodes, and provided adjacent to one of the separators, and a second output terminal electrically connected to the other of the electrodes through the tightening member, and provided adjacent to the one of the separators. The fluid unit is provided adjacent to the other of the separators.

It is preferable that the fuel cell stack discharges an exhaust gas toward the other of the separators, i.e., toward the fluid unit in the casing. Further, it is preferable that the casing has a multiple wall structure.

Further, it is preferable that the tightening member includes a tightening bolt for tightening an outer region or a central region of the fuel cell in the stacking direction. Further, it is preferable that the fluid unit comprises a reformer for reforming a fuel gas before it is supplied to the fuel cell stack.

According to the present invention, the first and second output terminals for collecting electrical energy from the fuel cell stack are provided adjacent to one of the separators, and the fluid unit is provided adjacent to the other of the separators. Therefore, the fuel cell stack is freely installed without any constraints of conductive wires, pipes, or the like. Thus, the fuel cell system allows for more freedom in the layout of the fuel cell stack and the fluid units.

Further, the other of the electrodes of the fuel cell stack and the second output terminal are electrically connected by the tightening member. With the simple structure, the electrical energy is collected reliably.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
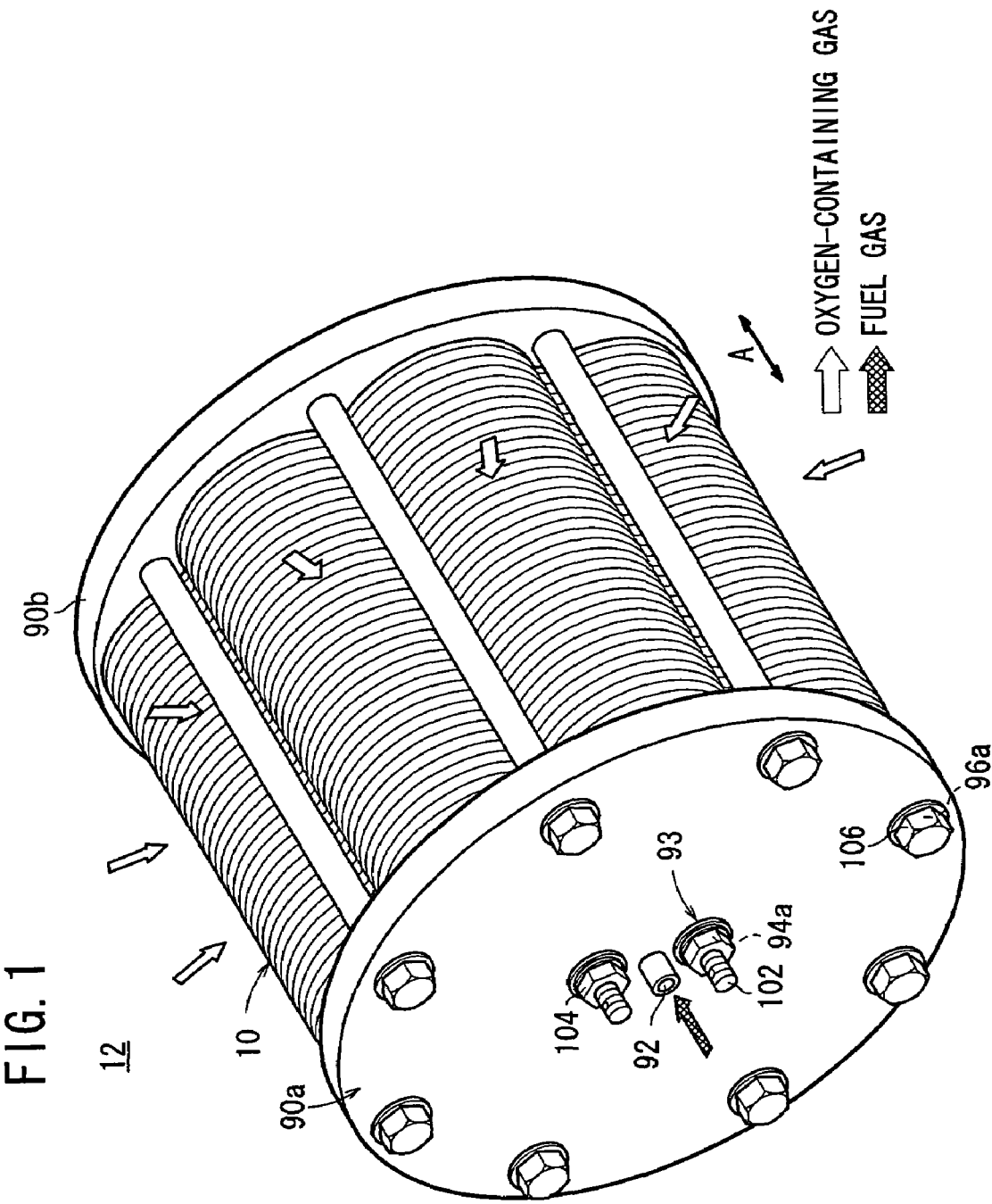
FIG. 1 is a perspective view schematically showing a fuel cell stack formed by stacking a plurality of fuel cells.
Figure 2:
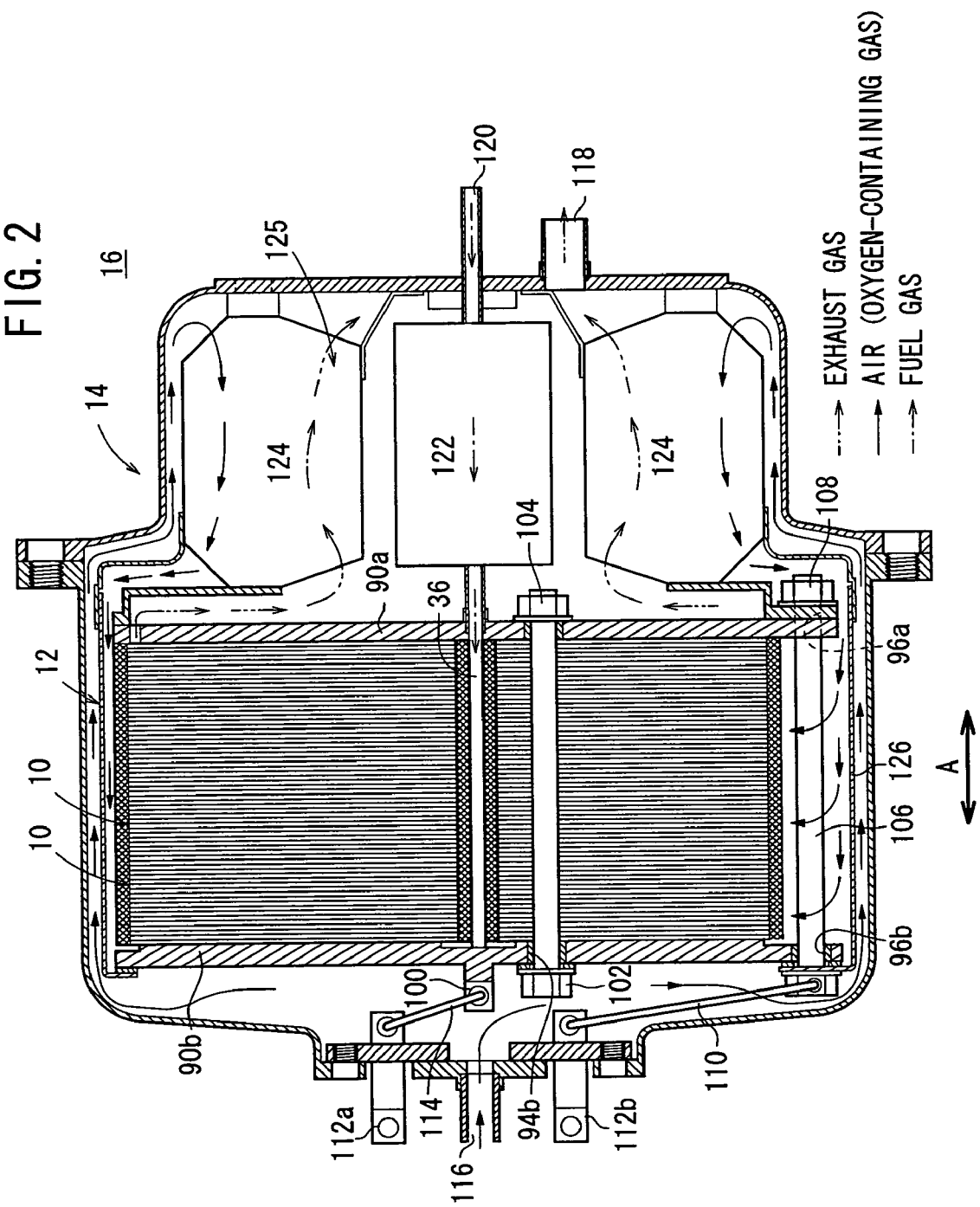
FIG. 2 is a cross sectional view showing part of a fuel cell system according to an embodiment of the present invention in which the fuel cell stack is disposed in a casing.

FIG. 1 is a perspective view schematically showing a fuel cell stack 12 formed by stacking a plurality of fuel cells 10 according to an embodiment of the present invention in a direction indicated by an arrow A. FIG. 2 is a cross sectional view showing part of a fuel cell system 16 in which the fuel cell stack 12 is disposed in a casing 14.

Figure 3:
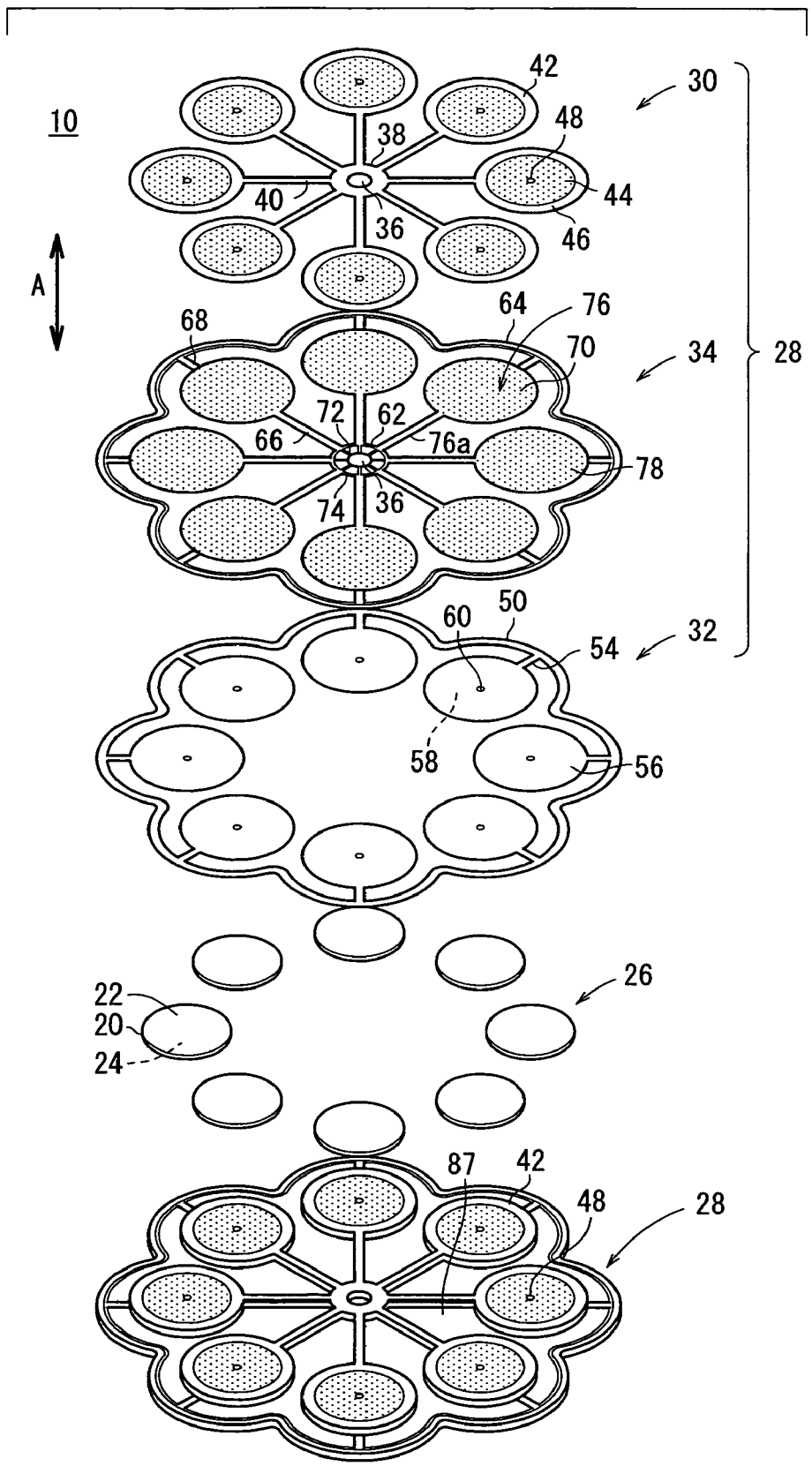
FIG. 3 is an exploded perspective view showing separators of the fuel cell.
Figure 4:
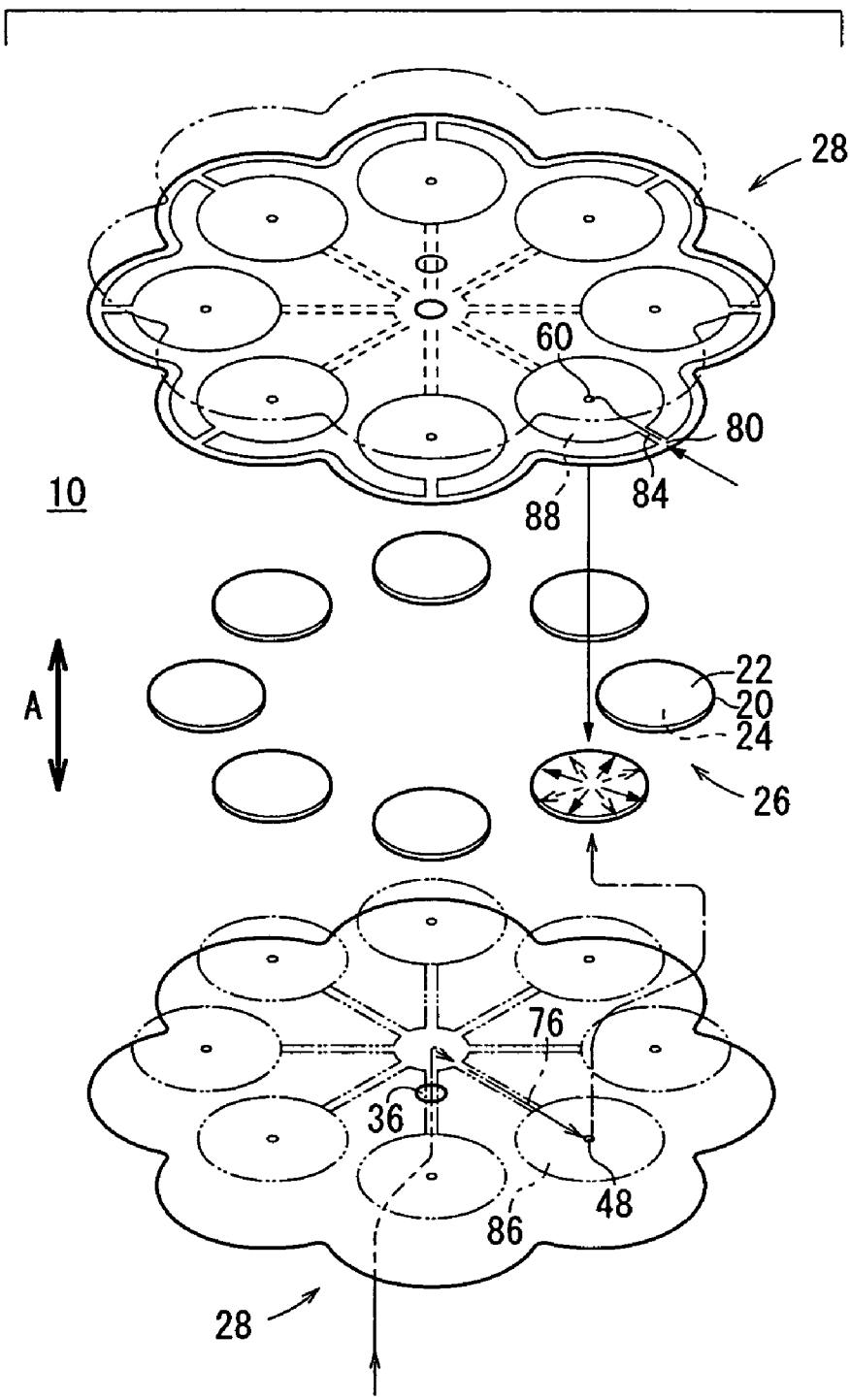
FIG. 4 is a partial exploded perspective view showing gas flows of the fuel cell.

The fuel cell 10 is a solid oxide fuel cell (SOFC) used in various applications, including stationary and mobile applications. The fuel cell 10 is mounted on a vehicle. As shown in FIGS. 3 and 4, the fuel cell 10 includes an electrolyte electrode assembly 26. The electrolyte electrode assembly 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 has a circular disk shape.

A plurality of, e.g., eight electrolyte electrode assemblies 26 are interposed between a pair of separators 28 to form the fuel cell 10. The electrolyte electrode assemblies 26 are concentric with a fuel gas supply passage 36 extending through the center of the separators 28.

As shown in FIG. 3, the separator 28 includes first and second plates 30, 32, and a third plate 34 interposed between the first and second plates 30, 32, which are stacked to one another. For example, the first through third plates 30, 32, 34 are metal plates of, e.g., stainless alloy. The first plate 30 and the second plate 32 are joined to both surfaces of the third plate 34 by brazing, for example.

The first plate 30 has a first small diameter end portion 38. The fuel gas supply passage 36 for supplying a fuel gas extends through the central of the first small diameter end portion 38. The first small diameter end portion 38 is integral with first circular disks 42 each having a relatively large diameter through a plurality of bridges 40. The bridges 40 are extending radially outwardly from the first small diameter end portion 38 at equal angles (intervals). The first circular disk 42 and the anode 24 of the electrolyte electrode assembly 26 have substantially the same size.

Each of the first circular disks 42 has a large number of first protrusions 44 on its surface facing the anode 24 of the electrolyte electrode assembly 26, in a central region adjacent to an outer circumferential region. A substantially ring shaped protrusion 46 is provided on the outer circumferential region of the first circular disk 42. The first protrusions 44 and the substantially ring shaped protrusion 46 jointly functions as a current collector. A fuel gas inlet 48 is provided at the center of the first circular disk 42 for supplying the fuel gas toward substantially the central region of the anode 24. The first protrusions 44 may be formed by making a plurality of recesses in a surface which is in the same plane with the surface of the substantially ring shaped protrusion 46.

Figure 6:
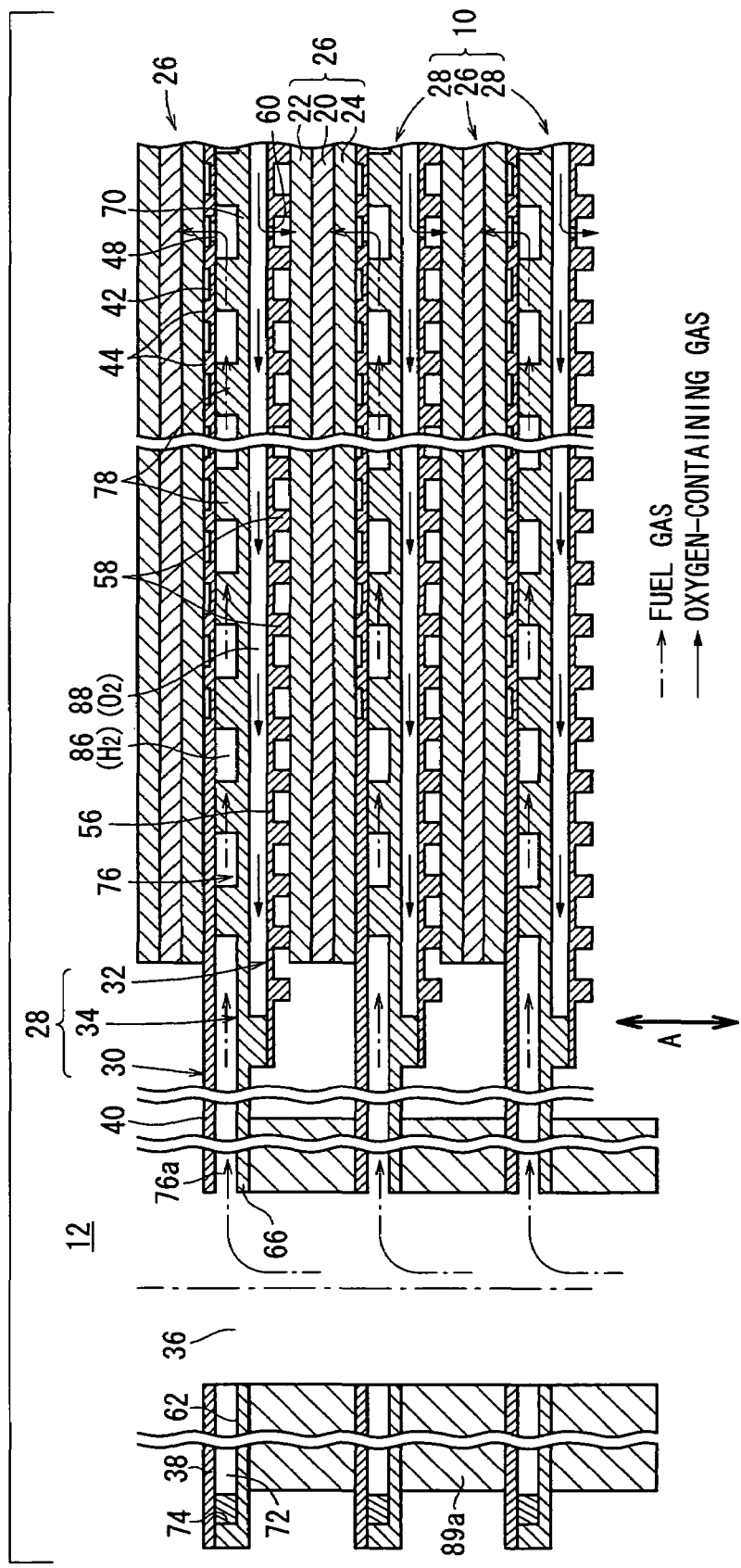
FIG. 6 is an enlarged cross sectional view showing a central region of the fuel cell.

The second plate 32 has a curved outer section 50. Respective circular arc portions of the curved outer section 50 are integral with second circular disks 56 each having a relatively large diameter through bridges 54 extending internally from the circular arc portions. As with the first circular disks 42 of the first plate 30, the number of the second circular disks 56 is eight, and the second circular disks 56 are provided at equal angles (intervals). As shown in FIG. 6, each of the second circular disks 56 has a plurality of second protrusions 58 on its surface which contacts the cathode 22 of the electrolyte electrode assembly 26. The second protrusions 58 function as a current collector. An oxygen-containing gas inlet 60 is provided at the center of the second circular disk 56 for supplying the oxygen-containing gas toward substantially the central region of the cathode 22 (see FIG. 3).

The third plate 34 has a second small diameter end portion 62. The fuel gas supply passage 36 extends through the center of the second small diameter end portion 62. Eight bridges 66 extend radially from the second small diameter end portion 62, and tip ends of the bridges 66 are integral with third circular disks 70 each having a relative large diameter. Bridges 68 are provided on extension lines of (in alignment with) the bridges 66. All the bridges 68 are integral with a curved outer section 64 of the third plate 34. The first through third circular disks 42, 56, 70 have the same diameter.

As shown in FIG. 3, the third plate 34 has a plurality of slits 72 radially formed in the second small diameter end portion 62, on a surface facing the first plate 30. The slits 72 are connected to the fuel gas supply passage 36. Further, the slits 72 are connected to a recess 74 formed in an outer circumferential region of the second small diameter end portion 62. The recess 74 prevents the flow of brazing material. A fuel gas channel 76 is formed in the bridge 66 and in the surface of the third circular disk 70. The fuel gas flows from the fuel gas supply passage 36 to the fuel gas channel 76 through the slits 72.

A plurality of third protrusions 78 are formed on the entire surface of the third circular disk 70 facing the first plate 30. The third protrusions 78 are part of the fuel gas channel 76.

Figure 5:
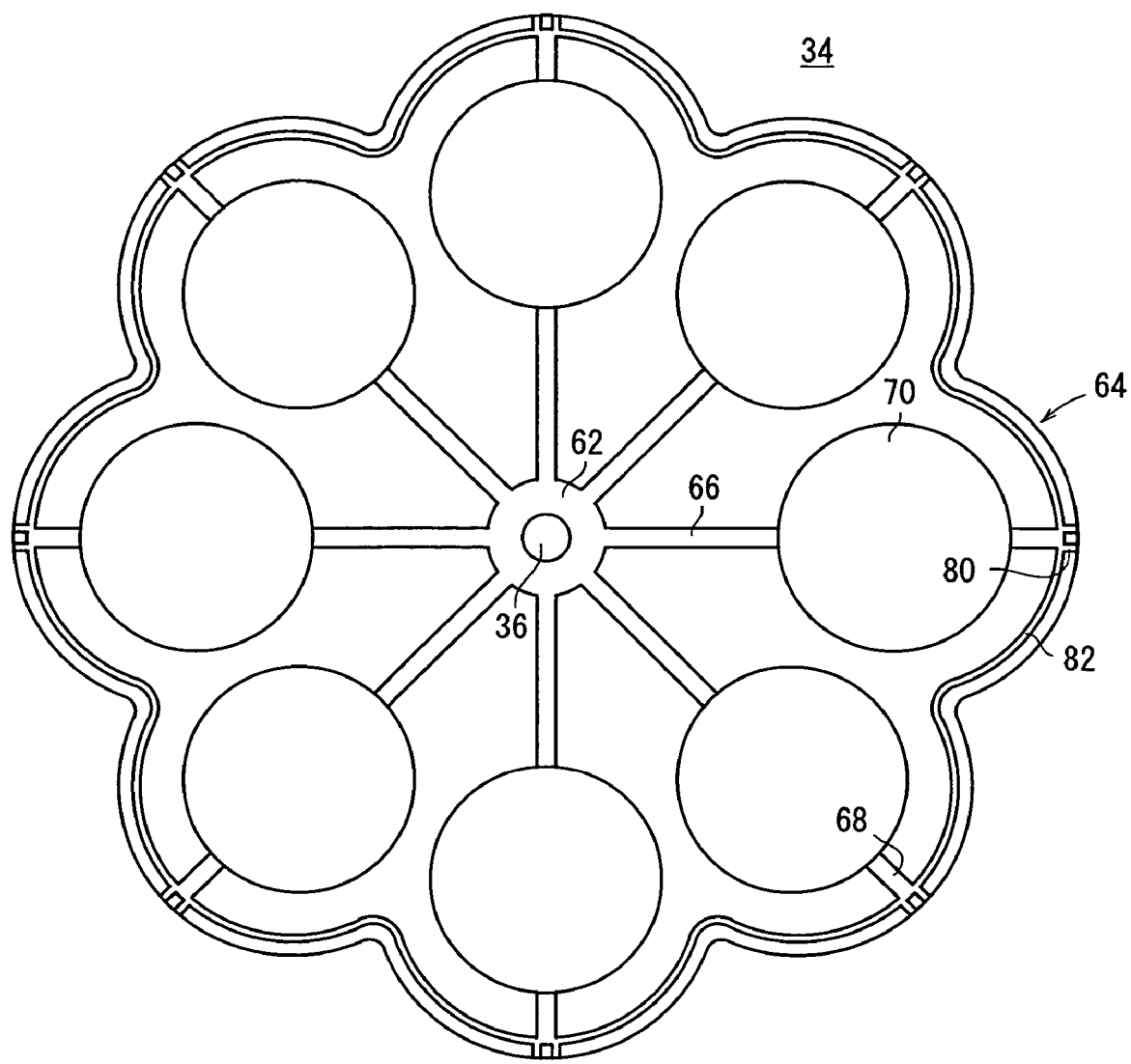
FIG. 5 is a view showing a surface of a third plate of the separator.

As shown in FIG. 5, the curved outer section 64 of the third plate 34 has a plurality of slits 80 as air intake passages at positions corresponding to the respective third circular disks 70, on a surface facing the second plate 32. Further, a recess 82 for preventing the flow of brazing material is formed along the profile of the curved outer section 64.

As shown in FIG. 6, the first plate 30 is joined to the third plate 34 by brazing. The bridge 40 of the first plate 30 and the bridge 66 of the third plate 34 are joined together to form a fuel gas channel member, and a fuel gas distribution passage 76a as part of the fuel gas channel 76 is formed in the fuel gas channel member. The fuel gas channel 76 is provided between the first and third circular disks 42, 70, over the electrode surface of the anode 24. The first circular disk 42 is provided between the fuel gas channel 76 and the anode 24, and the fuel gas is supplied to the fuel gas channel 76. That is, a fuel gas pressure chamber 86 is formed such that the first circular disk 42 tightly contacts the anode 24 under pressure.

Figure 7:
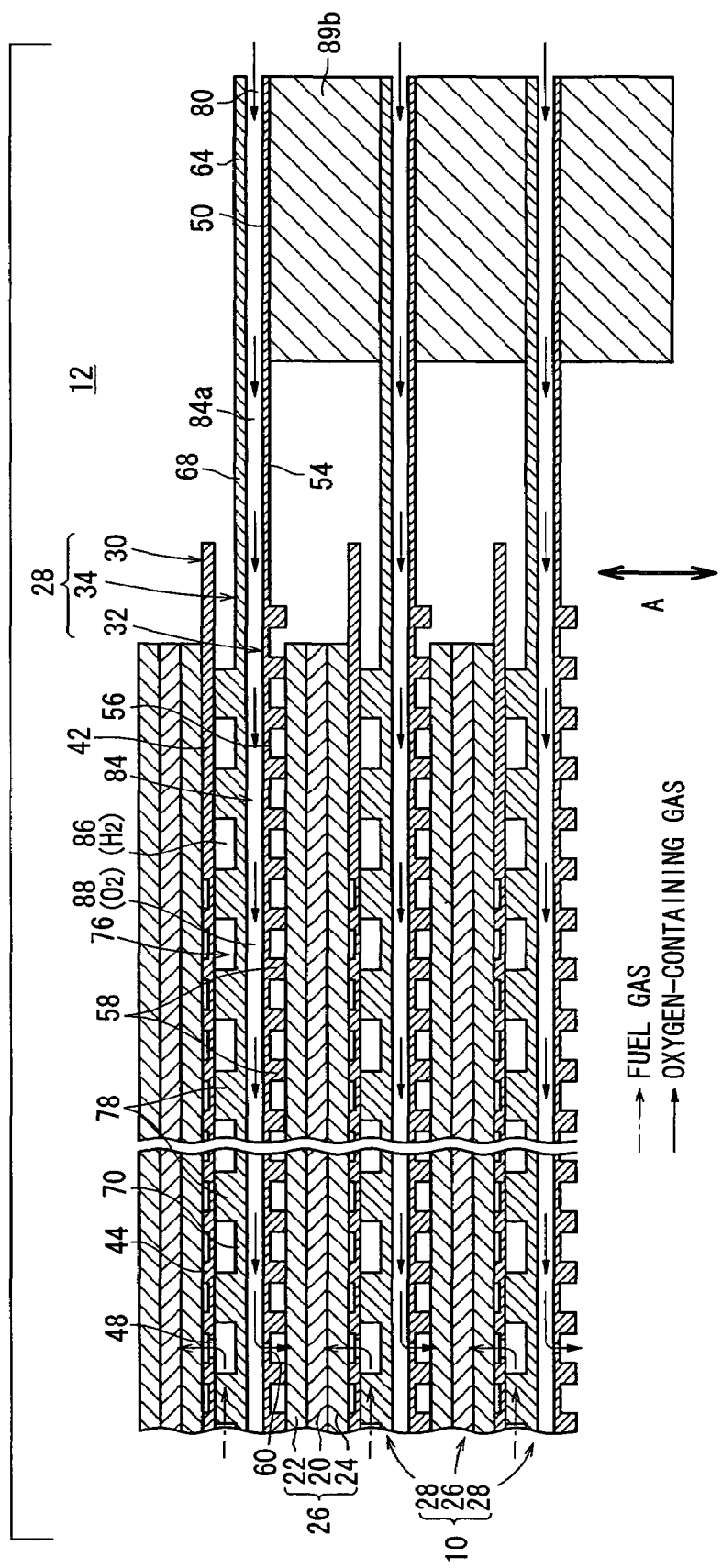
FIG. 7 is an enlarged cross sectional view showing an outer circumferential region of the fuel cell.

As shown in FIG. 7, when the second plate 32 is jointed to the third plate 34 by brazing, the respective bridges 54, 68 are joined together to form oxygen-containing gas channel members. Oxygen-containing gas distribution passages 84a as part of an oxygen-containing gas channel 84 are formed in the oxygen-containing gas channel members.

The oxygen-containing gas channel 84 is provided over the electrode surface of the cathode 22. The second circular disk 56 is provided between the oxygen-containing gas channel 84 and the cathode 22, and the oxygen-containing gas is supplied to the oxygen-containing gas channel 84. That is, an oxygen-containing gas pressure chamber 88 is formed such that the second circular disk 56 tightly contacts the cathode 22 under pressure. As shown in FIG. 3, an exhaust gas channel 87 is formed in the separator 28. After the fuel gas and the oxygen-containing gas are consumed in the reactions, the fuel gas and the oxygen-containing gas are mixed together, and the mixed gas flows as an exhaust gas into the exhaust gas channel 87 in the stacking direction.

As shown in FIG. 6, insulating seals 89a for sealing the fuel gas supply passage 36 are provided between the separators 28. Further, as shown in FIG. 7, insulating seals 89b are provided between the curved outer sections 50, 64. For example, the insulating seals 89a, 89b are made of mica material, or ceramic material.

As shown in FIGS. 1 and 2, the fuel cell stack 12 includes circular disk shaped end plates 90a, 90b provided at opposite ends of the fuel cells 10 in the stacking direction. The end plate 90a is insulated, and a fuel gas supply port 92 is formed at the center of the end plate 90a. The fuel gas supply port 92 is connected to the fuel gas supply passage 36 extending through each of the fuel cells 10.

The end plates 90a, 90b are tightened by tightening means 93 provided at positions near the fuel gas supply passage 36. The tightening means 93 applies a tightening load to the electrolyte electrode assemblies 26 and the separators 28 stacked in the direction indicated by the arrow A.

The tightening means 93 includes two bolt insertion holes 94a and eight bolt insertion holes 96a of the end plate 90a. The fuel gas supply port 92 (fuel gas supply passage 36) is positioned between the bolt insertion holes 94a. The eight bolt insertion holes 96a are provided near outer positions of the curved outer sections 50, 64. The bolt insertion holes 94a are provided in the exhaust gas channel 87 of the fuel cell stack 12.

The end plate 90b is made of electrically conductive material. As shown in FIG. 2, the end plate 90b has a connection terminal 100. The connection terminal 100 axially extends from the central region of the end plate 90b. Further, the end plate 90b has two bolt insertion holes 94b. The connection terminal 100 is positioned between the bolt insertion holes 94b. The bolt insertion holes 94a are in alignment with the bolt insertion holes 94b. Two tightening bolts 102 are inserted through the bolt insertion holes 94a, 94b, and tip ends of the tightening bolts 102 are screwed into nuts 104. The tightening bolts 102 are electrically insulated from the end plates 90a, 90b. The connection terminal 100 is electrically connected to a first output terminal 112a through a conductive wire 114.

Further, the end plate 90b has eight bolt insertion holes 96b in alignment with the bolt insertion holes 96a of the end plate 90a. Tightening bolts (tightening members) 106 are inserted into the respective bolt insertion holes 96a, 96b, and tip ends of the tightening bolts 106 are screwed into nuts 108. The tightening bolts 106 are connected electrically to the end plate 90a, and electrically insulated from the end plate 90b. The head of at least one of the tightening bolt 106 is connected to a second output terminal 112b through a conductive wire 110.

The first output terminal 112a is electrically connected to one of the poles (e.g., the anode 24) of the electrolyte electrode assembly 26. The second output terminal 112b is electrically connected to the other of poles (e.g., the cathode 22) of the electrolyte electrode assembly 26.

The first and second output terminals 112a, 112b are arranged in parallel, are adjacent to the end plate 90b, and also are adjacent to each other. The first and second output terminals 112a, 112b are fixed to the casing 14. The casing 14 has an air supply port 116 positioned between the first and second output terminals 112a, 112b. Further, an exhaust port 118 is provided near the side of the end plate 90a.

A fuel gas supply port 120 is provided adjacent to the exhaust port 118. The fuel gas supply port 120 is connected to the fuel gas supply passage 36 through a reformer 122 as necessary. A heat exchanger 124 is provided around the reformer 122. The heat exchanger 124 heats the oxygen-containing gas before it is supplied to the fuel cell stack 12. The reformer 122 and the heat exchanger 124 are fluid units 125. A multiple wall structure section, e.g., a dual wall structure section 126 is provided in the casing 14, and the fuel cell stack 12 is disposed in the dual wall structure section 126.

Operation of the fuel cell stack 12 will be described below.

As shown in FIG. 3, in assembling the fuel cell 10, firstly, the first plate 30 of the separator 28 is joined to one surface of the third plate 34, and the second plate 32 is joined to the other surface of the third plate 34. Thus, the third plate 34 divides a space in the separator 28 to form the fuel gas channel 76 connected to the fuel gas supply passage 36 and the oxygen-containing gas channel 84 connected to the slits 80 separately (see FIG. 4).

Figure 8:
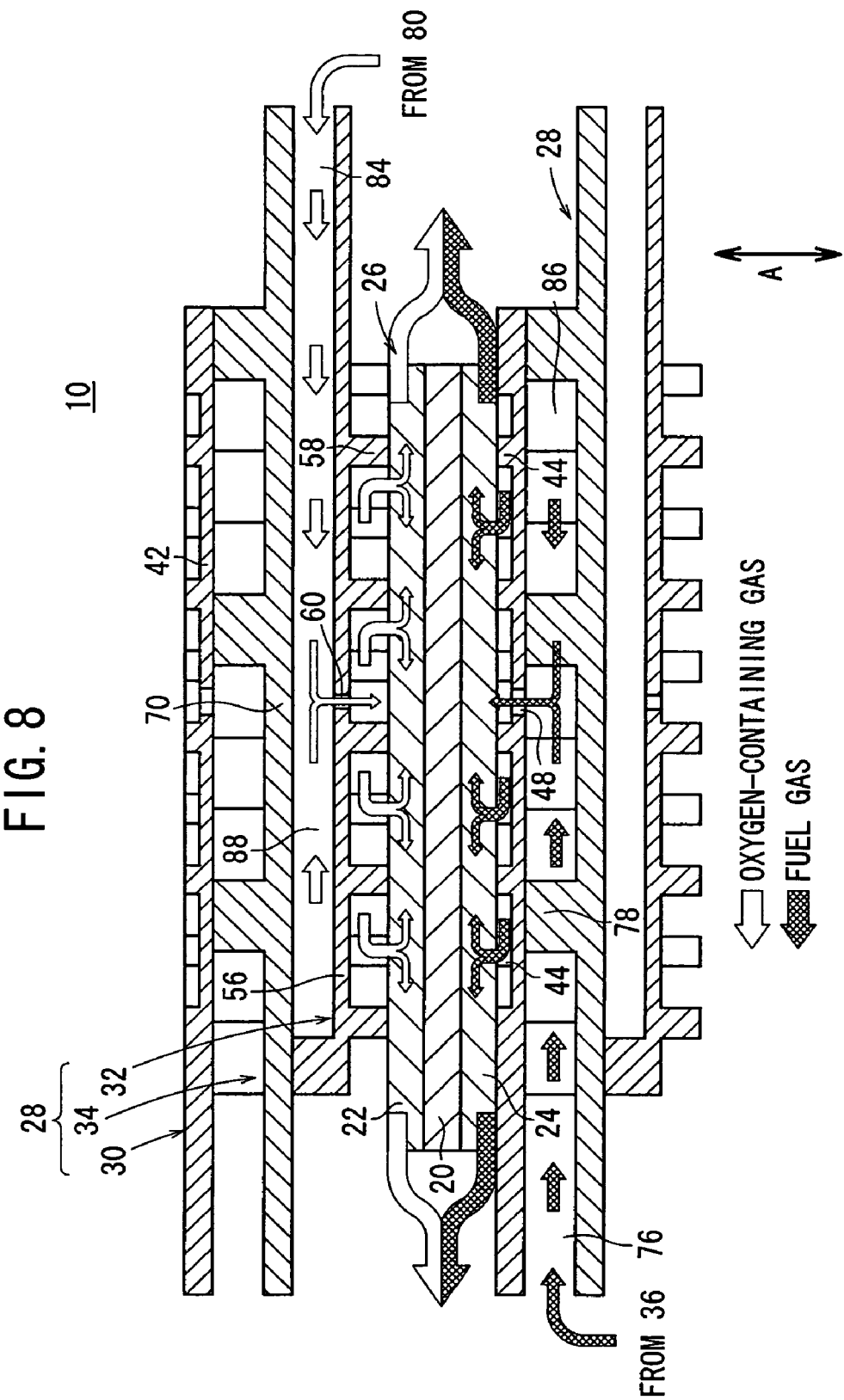
FIG. 8 is a cross sectional view schematically showing operation of the fuel cell.
Figure 9:
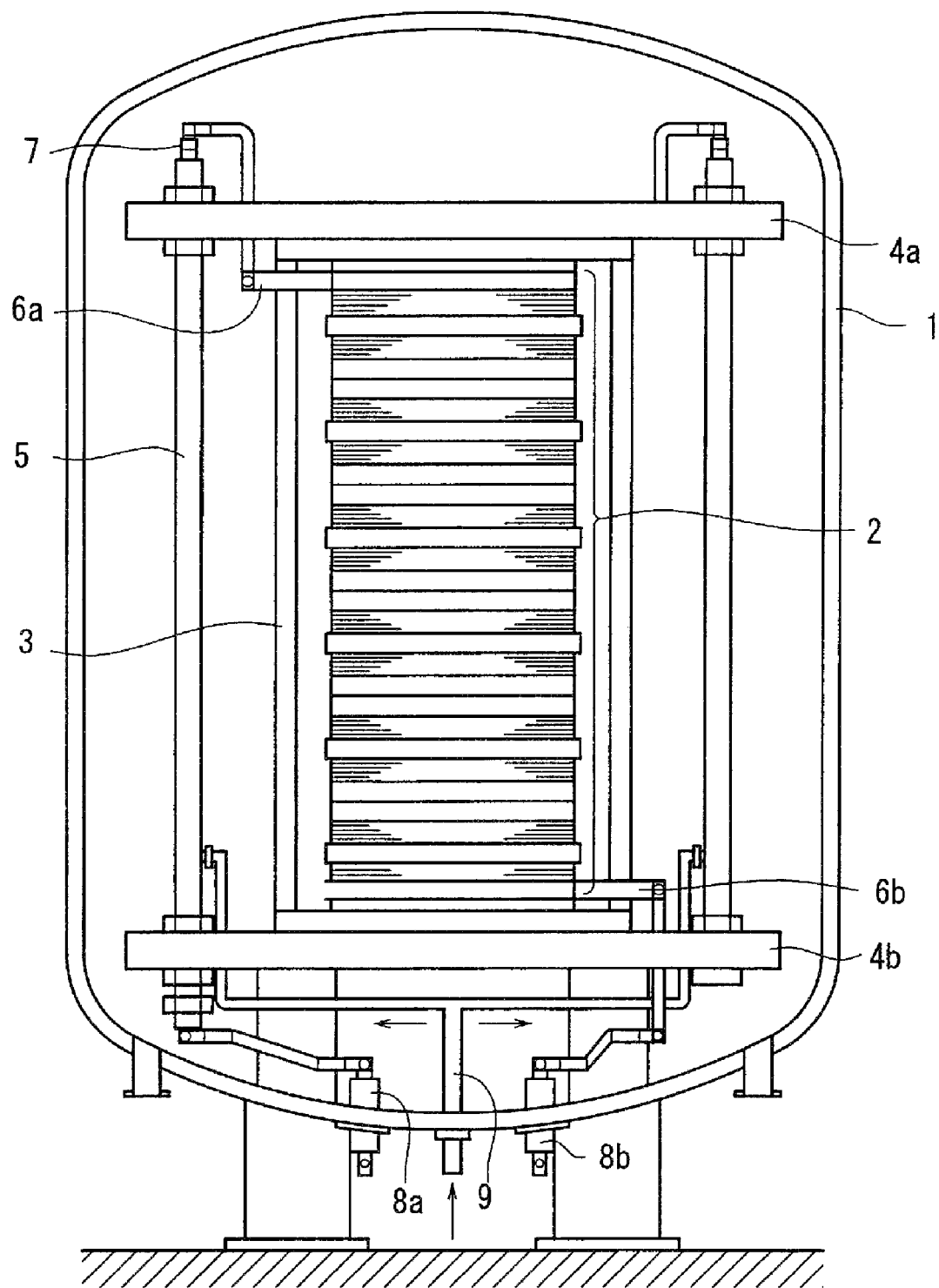
FIG. 9 is a cross sectional view showing a fuel cell disclosed in Japanese Patent No. 3,251,919.

Further, the fuel gas pressure chamber 86 is formed between the first and third circular disks 42, 70, and the oxygen-containing gas pressure chamber 88 is formed between the second and third circular disks 56, 70 (see FIG. 8).

Subsequently, the ring shaped insulating seal 89a is provided on the first plate 30 or the third plate 34 around the fuel gas supply passage 36 (see FIG. 6). Further, the curved insulating seal 89b is provided on the curved outer section 50 of the second plate 32 or the curved outer section 64 of the third plate 34 (see FIG. 7).

In this manner, the separator 28 is fabricated. Then, the eight electrolyte electrode assembles 26 are sandwiched between the separators 28 to form the fuel cell 10. As shown in FIG. 3, the electrolyte electrode assemblies 26 are placed between the separators 28, i.e., between the first circular disks 42 of one separator 28 and the second circular disks 56 of the other separator 28. The fuel gas inlet 48 is positioned at the center in each of the anodes 24, and the oxygen-containing gas inlet 60 is positioned at the center in each of the cathodes 22.

A plurality of the fuel cells 10 are stacked in the direction indicated by the arrow A, and the end plates 90a, 90b are provided at opposite ends in the stacking direction. The tightening bolts 102 are inserted into the respective bolt insertion holes 94a, 94b of the end plates 90a, 90b, and the tip ends of the tightening bolts 102 are screwed into the nuts 104. Likewise, the tightening bolts 106 are inserted into the respective bolt insertion holes 96a, 96b of the end plates 90a, 90b, and the tip ends of the tightening bolts 106 are screwed into the nuts 108. Thus, the stack of the separator 28 and the electrolyte electrode assemblies 26 are tightened together by the tightening means 93 to form the fuel cell stack 12 (see FIG. 1).

The fuel cell stack 12 is disposed in the casing 14. As shown in FIG. 2, a heat exchanger 124 as one of fluid units 125 is provided adjacent to the end plate 90a, and the first and second output terminals 112a, 112b are provided adjacent to the end plate 90b. A reformer 122 as one of the fluid units 125 is provided as necessary adjacent to the end plate 90a at a position near the heat exchanger 124.

Then, a fuel gas (e.g., hydrogen-containing gas) is supplied into the fuel gas supply port 120 of the casing 14, and an oxygen-containing gas (hereinafter also referred to as the air) is supplied into the air supply port 116 of the casing 14. The fuel gas flows through the reformer 122, and is supplied to the fuel gas supply passage 36 of the fuel cell stack 12. The fuel gas flows in the direction indicated by the arrow A, and flows into the fuel gas distribution passage 76a in the separator 28 in each of the fuel cells 10 (see FIG. 6).

Then, the fuel gas flows along the fuel gas distribution passage 76a, and along the fuel gas channel 76. The fuel gas is supplied into the fuel gas pressure chamber 86 formed between the first and third circular disks 42, 70. The fuel gas flows between the third protrusions 78, and flows into the fuel gas inlet 48 formed at the center of the first circular disk 42.

The fuel gas inlet 48 is provided at a position corresponding to the central position of the anode 24 in each of the electrolyte electrode assemblies 26. Therefore, as shown in FIG. 8, the fuel gas from the fuel gas inlet 48 is supplied to the anode 24, and flows from the central region of the anode 24 toward the outer circumferential region of the anode 24.

The oxygen-containing gas is supplied from the outer circumferential region in each of the fuel cells 10. Specifically, the oxygen-containing gas is supplied to the oxygen-containing gas channel 84 through the slits 80 formed in the outer circumferential region in each of the separators 28 (see FIG. 7). The oxygen-containing gas supplied to the oxygen-containing gas channel 84 flows into the oxygen-containing gas pressure chamber 88 between the second and third circular disks 56, 70, and flows into the oxygen-containing gas inlet 60 toward the cathode 22 of the electrolyte electrode assembly 26. The oxygen-containing gas flows from the central region of the cathode 22 toward the outer circumferential region of the cathode 22 (see FIG. 8).

Therefore, in the electrolyte electrode assembly 26, the fuel gas is supplied from the central region to the outer circumferential region of the anode 24, and the oxygen-containing gas is supplied from the central region to the outer circumferential region of the cathode 22 (see FIG. 8). At this time, oxygen ions flow toward the anode 24 through the electrolyte 20 for generating electricity by the chemical reactions.

The fuel cells 10 are connected in series in the stacking direction indicated by the arrow A. As shown in FIG. 2, one of the poles is connected from the connection terminal 100 of the electrically conductive end plate 90b to the first output terminal 112a through the conductive wire 114. The other pole is connected from the tightening bolts 106 to the second output terminal 112b through the conductive wires 110. Thus, the electric energy can be collected from the first and second output terminals 112a, 112b.

After the fuel gas and the oxygen-containing gas are consumed in the reactions, the fuel gas and the oxygen-containing gas flow toward the outer circumferential regions in each of the electrolyte electrode assembly 26, and are mixed together. The mixed gas flows as an exhaust gas into the exhaust gas channel 87 extending through the separators 28, and flows in the stacking direction. Then, the exhaust gas is discharged to the outside of the casing 14 from the exhaust port 118.

In the embodiment of the present invention, the first output terminal 112a connected electrically to one of the electrodes (e.g., the anode 24) of the fuel cell stack 12 is provided adjacent to the end plate 90b (one of the separators 28). Further, the second output terminal 112b electrically connected to the other of the electrodes (e.g., the cathode 22) through the tightening bolts 106 is provided adjacent to the end plate 90b.

That is, the first and second output terminals 112a, 112b are provided adjacent to the end plate 90b, and the fluid units 125 are provided adjacent to the end plate 90a (the other of the separators 28). Therefore, the fuel cell stack 12 can be installed without any constraints by the layout of conductive wires, pipes, or the like provided adjacent to the end plate 90b.

Thus, the layout of the fuel cell stack 12 and the fluid units 125 can be determined freely. Further, the other of the electrodes of the fuel cell stack 12 and the second output terminal 112b are electrically connected by the tightening bolts 106 as the tightening members. Thus, the electrical energy can be collected reliably with the simple structure.

The tightening bolts 106 are provided in the outer circumferential region of the fuel cell stack 12. Therefore, it is possible to cool the tightening bolts 106 by the flow of the oxygen-containing gas supplied to the outer region of the fuel cell stack 12. Thus, it is possible to decrease the electrical resistance while the tightening bolts 106 are protected. Therefore, improvement in the power generation efficiency is achieved easily.

Further, the exhaust gas is discharged to the outside from the exhaust port 118 near the side of the end plate 90a. Therefore, the conductive wires are not exposed to the exhaust gas atmosphere. Therefore, the service life of the conductive wires is increased, and the resistance value of the electrical current is reduced. Further, the heat of the exhaust gas is utilized in the fluid units 125. Thus, improvement in the thermal efficiency is achieved easily.

Further, the casing 14 includes the multiple wall structure section, e.g., the dual wall structure section 126, and the fuel cell stack 12 is disposed in the dual wall structure section 126. Therefore, heat insulation performance is improved by the dual wall structure section 126, and the thermal efficiency is improved desirably. Further, since the casing 14 is sealed hermetically, the sealing performance and the thermal insulation performance are improved.

The invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell system comprising:
a fuel cell stack including a plurality of fuel cells stacked in a stacking direction, a pair of end plates provided at opposite ends of said fuel cells in the stacking direction, and a tightening bolt for tightening said end plates at an outer region or a central region of said fuel cell stack in the stacking direction, said fuel cells each including an electrolyte electrode assembly and separators sandwiching said electrolyte electrode assembly, said electrolyte electrode assembly including a pair of electrodes and an electrolyte interposed between said electrodes;
a fluid unit including a heat exchanger for heating an oxygen-containing gas, before said oxygen-containing gas is supplied to said fuel cell stack; and
a casing containing said fuel cell stack and said fluid unit, wherein
said tightening bolt spans an entire length of said fuel cell stack in the stacking direction for tightening together said fuel cells and said end plates disposed at opposite ends of said fuel cells;
said fuel cell stack further comprises a first output terminal electrically connected to one of said electrodes, and provided adjacent to one of said end plates, and a second output terminal electrically connected to the other of said electrodes through said tightening bolt, and provided adjacent to the one of said end plates; and
said fluid unit is provided adjacent to the other of said end plates.

2. A fuel cell system according to claim 1, wherein said fuel cell stack discharges an exhaust gas toward said fluid unit.

3. A fuel cell system according to claim 1, wherein said casing has a multiple wall structure.

4. A fuel cell system according to claim 1, wherein said fluid unit comprises a reformer for reforming a fuel gas, before said fuel gas is supplied to said fuel cell stack.

* * * * *